United States Patent [19]

Iwatsuki et al.

[11] Patent Number: 4,790,211

[45] Date of Patent: * Dec. 13, 1988

[54] POWER TRANSMISSION DEVICE FOR FOUR WHEEL DRIVE VEHICLE HAVING AN IMPROVED DIFFERENTIAL MOTION LIMITING MECHANISM

[75] Inventors: Tatsuya Iwatsuki, Okazaki; Mutsumi Kawamoto, Tokyo; Takenori Kano, Anjo, all of Japan

[73] Assignee: Aisin-Warner Kabushiki Kaisha, Anjo, Japan

[*] Notice: The portion of the term of this patent subsequent to May 24, 2005 has been disclaimed.

[21] Appl. No.: 948,218

[22] Filed: Dec. 31, 1986

[30] Foreign Application Priority Data

Sep. 30, 1985 [JP] Japan ................... 60-218433

[51] Int. Cl.⁴ ............................................. F16H 37/10
[52] U.S. Cl. .................................... 74/701; 74/711; 180/247
[58] Field of Search .............. 74/665 GC, 665 T, 700, 74/701, 694, 710.5, 711, 713; 180/247, 248, 249, 250; 192/85 AA

[56] References Cited

U.S. PATENT DOCUMENTS

| 3,612,237 | 10/1971 | Honda | 192/85 AA |
| 3,650,364 | 3/1972 | Laing | 192/85 AA |
| 3,894,446 | 7/1975 | Snoy et al. | 180/250 X |
| 3,974,717 | 8/1976 | Breed et al. | 74/713 |
| 3,999,634 | 12/1976 | Howell | 192/85 AA X |
| 4,012,968 | 3/1977 | Kelbel | 74/711 |
| 4,520,690 | 6/1985 | Dangel | 74/705 X |
| 4,582,160 | 4/1986 | Weismann et al. | 180/250 |
| 4,643,045 | 2/1987 | Katayama | 180/249 X |

FOREIGN PATENT DOCUMENTS

| 1318548 | 1/1963 | France | 74/711 |
| 63523 | 4/1983 | Japan | 180/248 |
| 57032 | 4/1984 | Japan | 180/248 |
| 81226 | 5/1984 | Japan | 180/248 |

Primary Examiner—Leslie A. Braun
Assistant Examiner—Dwight G. Diehl
Attorney, Agent, or Firm—Frank J. Jordan; C. Bruce Hamburg; Manabu Kanesaka

[57] ABSTRACT

A power transmission device for a full-time four wheel drive vehicle has a differential motion limiting device composed of a hydraulic frictional clutch such as a wet multiple disc type clutch. The friction clutch is disposed between a diff-carrier constituting a front wheel differential gear and a ring gear mount casing covering the diff-carrier and arranged coaxially with the diff-carrier. The ring gear mount casing is associated with the diff-carrier in a center differential gear, and the diff-carrier of the front wheel differential gear is associated with the left hand side gear in the center differential gear. Thus, when the friction clutch is engaged, the ring gear mount casing and the diff-carrier of the front wheel differential gear are integrally coupled with each other so that the rotation of the ring gear is transmitted directly to the front wheel differential gear, while the two elements in the center differential gear are integrally coupled with each other to lock the center differential gear.

3 Claims, 3 Drawing Sheets

PRIOR ART

POWER TRANSMISSION DEVICE FOR FOUR WHEEL DRIVE VEHICLE HAVING AN IMPROVED DIFFERENTIAL MOTION LIMITING MECHANISM

BACKGROUND OF THE INVENTION AND RELATED ART STATEMENT

The present invention relates to a power transmission device for a four wheel drive vehicle, and particularly to a power transmission device for a four wheel vehicle such as a front engine-front wheel drive vehicle. More precisely, it concerns a differential motion limiting mechanism in a power transmission device for a full-time four wheel drive vehicle which transmits rotation to the front and rear wheels at all times.

Heretofore, there have been proposed various kinds of power transmission devices for four wheel drive vehicles, which are obtained by slightly modifying power transmission devices for transverse front-engine front wheel drive vehicles.

In the above-mentioned conventional devices, as shown in FIG. 3, drive power from an engine transmitted through a hollow shaft 45' to a differential gear carrier (diff-carrier) 41' rotatably supported on shaft sections 42'a, 43'a of both side gears 42', 43' in a center deferential gear 33', is distributed to both side gears 42', 43' from diff-pinion 46' on the diff-carrier 41', the driver power transmitted to the left hand side gear 42' being transmitted through another hollow shaft 47' to a front wheel side differential gear (not shown) and distributed among side gears to be transmitted to front axles on both sides (only the right front axle 31' is shown in FIG. 3.), while the drive power transmitted to the right hand side gear 43' is transmitted through a ring gear mount casing 32' and a rear wheel drive ring gear 35' to a gear 40' and then from a drive pinion shaft 39' through a propeller shaft and a final speed reduction gear (not shown), to be distributed among rear axles on both sides.

It is noted that a center differential gear 33' is indispensable for a full-time four wheel drive vehicle in order to prevent the vehicle from experiencing the phenomenon commonly known as tight cornering brake, which is a braking condition due to a difference in rotational speeds between the front and rear wheels when the vehicle makes a tight turn at low speed on a road surface having a high friction coefficient. On the other hand, it is necessary to provide a differential motion limiting mechanism for stopping or limiting the operation of the differential gear, since the existence of the center differential gear 33' results in a condition where no torque can be transmitted due to the operation of the differential gear, when any one of the wheels of the four wheel drive vehicle loses grip. The conventional differential motion limiting mechanism comprises a sleeve S for engaging and disengaging the left hand side gear 43' against an inner ring 41'a supporting the pinion shaft 46' of the diff-carrier 41', this sleeve S being slidably supported on the shaft section 43'a of the side gear 43' through splines. As shown in the lower half section of FIG. 3, when the sleeve S is retracted into the shaft section 43'a, the center differential gear 33' is in its operating condition, and when it is extended from the shaft section 43'a and its front end engages the inner ring 41'a of the diff-carrier 41 as in a dog clutch, the center differential gear 33 is locked.

In a mechanical differential motion limiting mechanism such as the dog clutch type mentioned above, if the difference in rotational speeds between the side gear 43' and the inner ring 41'a is large during abrupt turns, it is difficult to engage the sleeve S with the inner ring 41'a, and also if a large surface pressure due to torque acts upon the engaged tooth surfaces of the sleeve S with inner ring 41'a, it is difficult to disengage the sleeve S from the inner ring 41'a. Hence, it is impossible to engage and disengage the differential motion limiting mechanism smoothly and swiftly.

Accordingly, an object of the present invention is to provide a differential motion limiting mechanism for a fulltime four wheel drive vehicle, which can be engaged and disengaged smoothly and swiftly, by use of a hydraulic friction clutch in the differential motion limiting mechanism.

SUMMARY OF THE INVENTION

The present invention is devised in view of the above-mentioned circumstances, and the differential motion limiting mechanism is consists of a hydraulic friction clutch such as, for example, a wet multiple disc clutch, the hydraulic friction clutch being disposed between a diff-carrier constituting the front wheel differential gear and a casing (ring gear mount casing) covering the diff-carrier and which is a transmitting member arranged coaxially with the diff-carrier. The casing is associated with one of elements such as a diff-carrier constituting the center differential gear, and the diff-carrier in the front wheel differential gear is associated with another element, such as the left hand side gear, of the center differential gear.

It is desirable to arrange the front wheel differential gear, the differential motion limiting mechanism and the center differential gear coaxially with each other, so that the diff-carrier in the center differential gear is associated with the ring gear mount casing through a first hollow shaft, and the left hand side gear is associated with the diff-carrrier in the front wheel differential gear through a second hollow shaft fitted over the front axle extending from the front wheel differential gear, and fitted inside the first hollow shaft.

DETAILED DESCRIPTION OF THE PREFERRED EMBODIMENTS

The present invention shall now be explained in one embodiment form with reference to the drawings.

Figure 2:
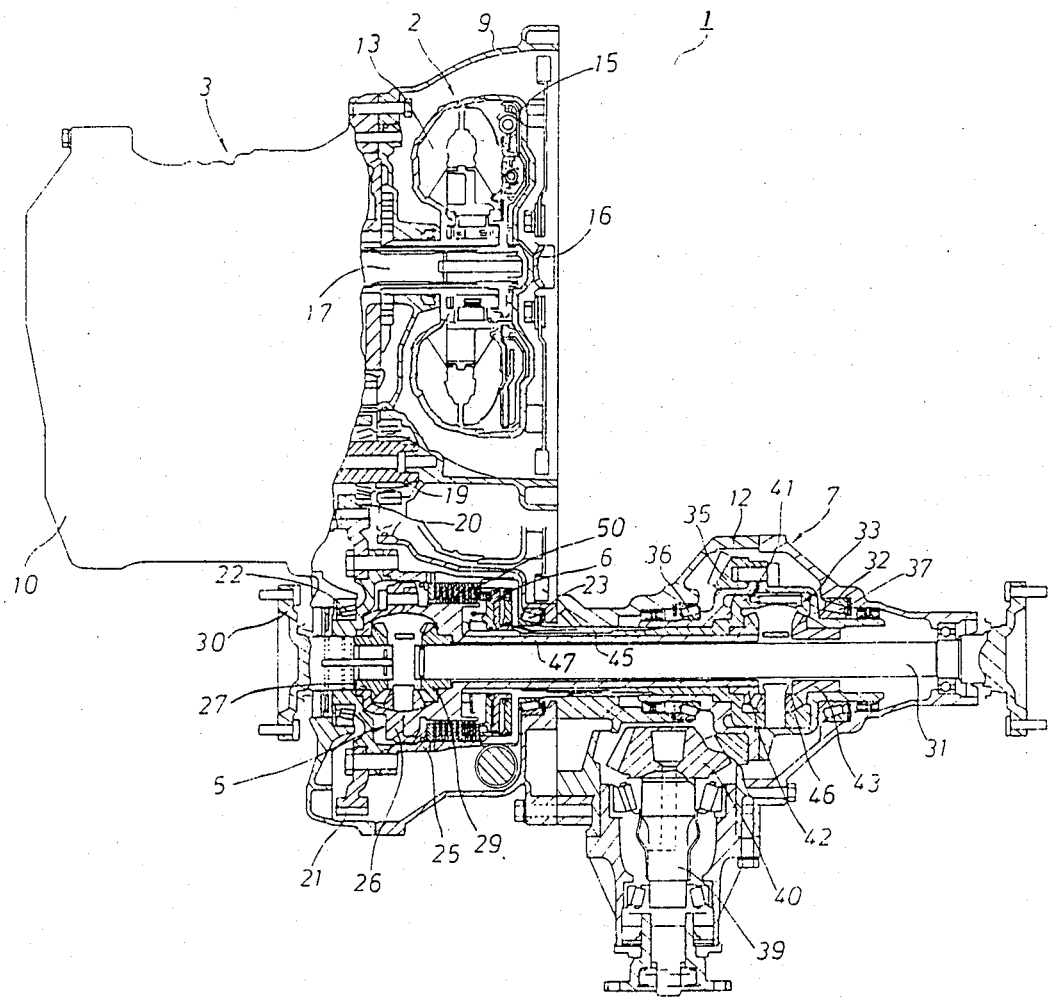
FIG. 2 is a cross-sectional view illustrating a power transmission device for a four wheel drive vehicle to which the present invention is applied.
Figure 3:
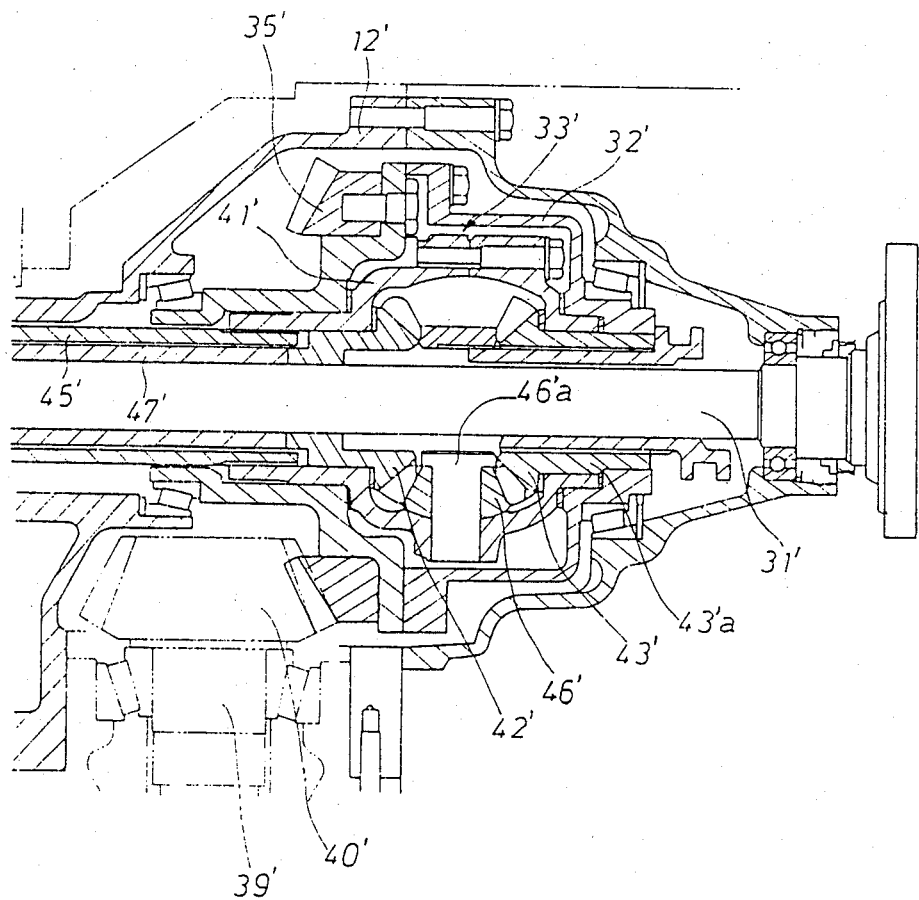
FIG. 3 is a cross-sectional view illustrating a transfer unit provided with a conventional center differential gear.

A power transmission device 1 for a transverse front-engine full-time four wheel drive vehicle, is provided, as shown in FIG. 2, with a torque converter unit 2, an automatic transmission section 3, a front wheel differential gear 5, a differential motion limiting mechanism 6 and a transfer unit 7, these being disposed in a trans-axle housing 9, a trans-axle casing 10 and a transfer casing 12 which are joined to each other. The torque converter section 2 is composed of a torque converter 13 and a lock-up clutch 15, the rotation of the engine output shaft 16 being transmitted through them to an input shaft 17. The automatic transmission 3 is composed of a three stage planetary gear unit which is controlled by a clutch and brake, the rotation of the input shaft 7 being subjected to speed reduction at any of the first, second, third, overdrive and reverse gear stages and transmitted to an output gear 20 rotatably supported on a shaft 19.

Figure 1:
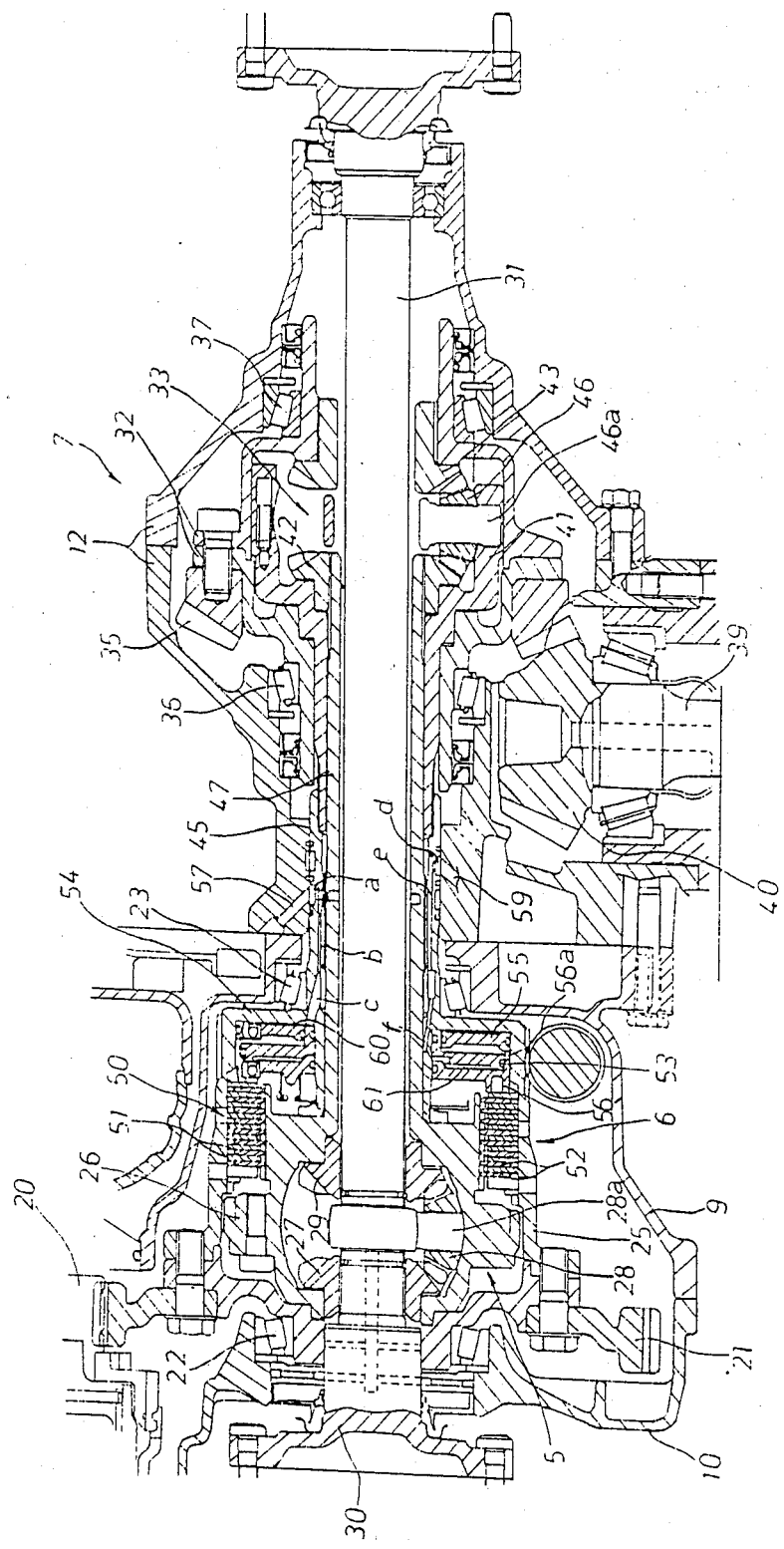
FIG. 1 is a cross-sectional view illustrating a transfer unit provided with a front wheel differential gear, a differential motion limiting mechanism and a center differential gear according to the present invention.

As shown in FIG. 1 in detail, the front wheel differential gear 5 is coaxially disposed in a mount casing 25 securing a first ring gear 21 meshed with the gear 20 and which is supported by the casings 10, 9 through tapered roller bearings 22, 23, its front diff-carrier 26 being rotatably incorporated in the mount casing 25. The diff-carrier 26 rotatably supports pinion shaft 28a extending in the radial direction supporting a pinion 28, and left and right hand side gears 27, 29 extending laterally. The side gears 27, 29 are drivingly coupled to front axles 30, 31. The two piece transfer casing 12 is incorporated at the right side of the first ring gear mount casing 25 and the front wheel differential gear 5, at the rear of the engine, and the transfer unit 7 is disposed within the transfer casing 12, being coupled coaxially with the first ring gear mount casing 25 and the front wheel differential gear 5. The transfer unit 7 comprises a two piece second ring gear mount casing 32 supporting a rear wheel drive second ring gear 35, which is rotatably supported by the transfer casing 12 through a pair of tapered roller bearings 36, 37. The second ring gear 35 is meshed with a gear 40 on a drive pinion shaft 39 that is drivingly coupled to rear axles through a known propeller shaft and a known rear wheel drive differential gear (not shown). The center differential gear 33 is disposed within the second ring gear mount casing 32, and has a cantilever structure diff-carrier 41 which is held and supported between the inside of the second ring gear mount casing 32 and the outside of the left hand side gear 42. The rotation of the first ring gear mount casing 25 is transmitted to the diff-carrier 41 through the first hollow shaft 45. Pinion shaft 46a is supported by the diff-carrier 41. The second ring gear mount casing 32 is spline-coupled directly to the right hand side gear 43, and the diff-pinion 46 fitted on the pinion shaft 46a is meshed with both left and right hand side gears 42, 43, the right front axle piercing through both side gears 42, 43 and projecting rightward from the right side end of the transfer casing 12. The left hand side gear in the center differential gear 33 is coupled to the front diff-carrier 26 in the front wheel differential gear 5 through a second hollow shaft 47 drivingly spline-coupled to the left side end of the side gear 42 and rotatably incorporated over the front axle 31.

The differential motion limiting mechanism 6 is disposed in the first ring gear mount casing 25 which is arranged coaxially with the front wheel differential gear 5 to cover the front wheel differential gear 5, and comprises wet multiple disc clutch 50. The clutch 50 has outer friction plates 51 coupled to the mount casing 25 and inner friction plates 52 coupled to the diff-carrier 26, the friction plates 52 being adapted to be compressed by the first and second pistons 55, 56 disposed in a cylinder formed in the mount casing 25. A reaction plate 53 is disposed in an oil-tight manner between the first and second pistons 55, 56 within the cylinder, hence these pistons are arranged to constitute a double piston mechanism in which the first piston 55 abuts against the outer peripheral flange section 56a of the second piston 56, while the second piston 56 abuts in turn against one side of the reaction plate 53. Oil passages 57, 59 are formed in the transfer casing 12 in a part facing the transfer axle housing 9, at different angular positions, the first oil passage 57 communicating with an oil chamber 60 acting upon the first piston 55, through annular groove a and oil grooves b, c formed in the first hollow shaft 45, while the second oil passage 59 communicates with an oil chamber 61 acting upon the second piston 56 through annular groove d and oil grooves e, f.

Next, explanation will be made of the operation of the above-mentioned arrangement.

The revolutions of the engine is are transmitted to the automatic transmission 3 through the torque converter 13 or the lock-up clutch 15, and subjected to a speed reduction by the automatic transmission 3, then delivered to the output gear 20, and on to the first mount casing 25 through the first ring gear 21. During normal operation, no hydraulic pressure is fed into the hydraulic chambers 60, 61 and therefore, the wet multiple disc type clutch remains in a disengaged condition. In this condition, the rotation of the first mount casing 25 is transmitted to the diff-carrier 41 in the center differential gear 33 through the first hollow shaft 45, and is then distributed and transmitted from the diff-pinion 46 to the left and right hand side gears 42, 43. The rotation of the left hand side gear 42 is transmitted to the diff-carrier 26 of the front wheel differential gear 5 through the second hollow shaft 47 and is then distributed and transmitted from the diff-pinion 28 to the side gears 27, 29 from which the rotation is transmitted to the left and right front axles 30, 31. Meanwhile, the rotation of the right hand side gear 43 is transmitted to the second mount casing 32 spline-coupled therewith, and then transmitted through the rear wheel drive ring gear 35 and gear 40 to the drive pinion shaft 39 from which the rotation is transmitted to the left and right rear axles through the propeller shaft and the rear wheel differential gear (not shown).

When tire slippage occurs on a snowy or frozen road surface or the like, or when any of the wheels drops in a gutter and loses grip, hydraulic pressure is fed into the oil chambers 60, 61 to engage the wet multiple disc clutch 50. In this condition, the rotation of the first mount casing 25 is transmitted to the diff-carrier 26 in the front wheel differential gear 5 through the clutch 50, and then is transmitted from the front wheel differential gear 5 to the left and right axles 30, 31. Simultaneously, the diff-carrier 41 and the left hand side gear 42 in the center differential gear 22 integrated with the first mount casing 25 and the diff-carrier 26 respectively through the hollow shafts 45, 47 are rotated in unison with no differential motion, transmitting rotation to the second mount casing 32. With this arrangement, revolutions equal to that of the front wheel drive diff-carrier 26 are transmitted to the rear wheel drive ring gear 35 to drive the left and right rear axles.

At this stage, the first and second pistons 55, 56 may be selectively operated in accordance with the condition of the road surface. When it is desirable to allow a certain degree of difference in rotational speeds between the front and rear wheels, for example on a snowy road surface or the like, hydraulic pressure is fed into the oil chamber 60 alone through the oil grooves a, b, c. Then the first piston 55 presses the flange section 56a of the second piston 56 to engage the wet multiple disc clutch 50 with a relatively small force. In this condition, when a difference in torque between the front and rear wheels exceeds a predetermined value, the wet multiple disc type clutch 50 slips to allow the torque to be borne by the center differential gear 33 so that required torque can be transmitted to the front and rear wheels even when one of the wheels slips, while avoiding any tight cornering brake phenomenon and any tire slippage due to rotational difference upon cornering. When any one of the front and rear wheels drops in a gutter, in addition to supply of hydraulic pressure into the abovementioned oil chamber 60, hydraulic pressure is also fed into the oil chamber 61 through the oil passage 59 and oil grooves d, e, f. Then, the compressive force acting in the oil chamber 61 between the second piston 56 and the reaction plate 53 also acts upon the second piston 56 in addition to the force exerted by the first piston 55, engaging the wet multiple disc clutch 50 with a relatively large force. In this condition, the clutch allows virtually no slip so that equal revolution is transmitted to both front and rear wheels, avoiding disabling of the transmission to allow the wheel to escape from the gutter.

Although it has been explained in the embodiment mentioned above that the wet multiple disc clutch 50 is actuated by a double piston mechanism, it may also be actuated by an ordianry hydraulic actuator composed of one piston.

According to the present invention, since the differential motion limiting device 6 is constituted by a hydraulic friction clutch 50, it can be switched between its engagement and disengagement conditions, smoothly and swiftly, thereby enabling appropriate and quick change over of the four wheel drive mode in accordance with road conditions even with a full-time four wheel drive vehicle. Further. since the hydraulic friction clutch 50 is disposed between the diff-carrier 26 in the front wheel differential gear 5 and the ring gear mount casing 25 covering the diff-carrier 26 and which is a transmitting member arranged coaxially with the diff-carrier, both diff-carrier and mount casing 25 being associated with the elements 41, 43 constituting the center differential gear 33, the power transmission device can be compact even with the use of a hydraulic frictional material clutch 50 as the differential motion limiting device 6. The arrangement of oil passages 57, a, b, c, 59, d, e, f for controlling the clutch 50 also can be simple. The power transmission device for a four wheel drive vehicle can be obtained by slight modification to a power transmission device for a front engine-front wheel drive vehicle, facilitating coping with wide variation of vehicle types. Further, since the hydraulic frictional material clutch 50 is disposed on the downstream side of the center differential gear 33, relative rotation between outer frictional members 51 and inner frictional members 52 is relatively small, and therefore, engagement shocks upon switching modes are extremely slight and advantageous in controlling slippage.

By arranging the front wheel differential gear 5, the differential motion limiting mechanism 6 and the center differential gear 33 coaxially with each other, and, in turn a by arranging the front axle 31, the first hollow shaft 45 and the second hollow shaft 47 coaxially with each other, the overall size of the power transmission device for a four-wheel drive vehicle, particularly lengthwise of the vehicle, can be made substantially equal to that of a front enginefront wheel drive vehicle.

By comprising the hydraulic friction clutch as wet multiple disc type clutch 50, and controlling the clutch 50 controlled by a double piston mechanism 55, 56, slippage control can be made simple without using complicated arrangements such as a pressure regulating solenoid or duty control.

What is claimed is:

1. A power transmission device with an improved differential motion limiting mechanism for a four wheel drive vehicle having automatic transmission means, front wheel differential gear means, differential motion limiting means and transfer unit means including center differential gear means, comprising:

a first gear mount casing having a gear adapted to mesh with an output of a transmission;

a differential motion limiting device arranged together with a front wheel differential gear in said first gear mount casing, said front wheel differential gear having a first diff-carrier and said differential motion limiting device comprising a hydraulic friction clutch for engaging and disengaging said first gear mount casing with the first diff-carrier of said front wheel differential gear;

a second gear mount casing disposed coaxially with respect to said first gear mount casing; and a transfer unit including a center differential gear arranged in said second gear mount casing, said center differential gear comprising a second diff-carrier coupled with said first gear mount casing, a first side gear coupled with the first diff-carrier of said front wheel differential gear, and a second side gear coupled with said second gear mount casing for transmitting power to the rear wheels.

2. A power transmission device with an improved differential motion limiting mechanism for a four wheel drive vehicle as set forth in claim 1, wherein the second diff-carrier of said center differential gear and the first gear mount casing are connected through a first hollow shaft, and said first side gear and the first diff-carrier of said front wheel differential gear are coupled through a second hollow shaft located inside said first hollow shaft and fitted over a front axle extending from said front wheel differential gear.

3. A power transmission device with an improved differential motion limiting mechanism for a four wheel drive vehicle as set forth in claim 1, wherein said hydraulic friction clutch is a wet multiple disc type clutch.

* * * * *

UNITED STATES PATENT AND TRADEMARK OFFICE
CERTIFICATE OF CORRECTION

PATENT NO. : 4,790,211
DATED : December 13, 1988
INVENTOR(S) : Tatsuya Iwatsuki et al It is certified that error appears in the above-identified patent and that said Letters Patent are hereby corrected as shown below:

On the title page delete

"[30]   Foreign Application Priority Data
   Sep. 30, 1985 [JP]   Japan ................ 60-218433"

Signed and Sealed this

Twenty-fifth Day of April, 1989

Attest:

DONALD J. QUIGG

Attesting Officer

Commissioner of Patents and Trademarks